United States Patent [19]

Claas et al.

[11] 4,303,079
[45] Dec. 1, 1981

[54] RADIAL BLOWING DEVICE FOR A CLEANING ARRANGEMENT OF A HARVESTER THRESHER

[75] Inventors: Helmut Claas; Franz Tophinke, both of Harsewinkel, Fed. Rep. of Germany

[73] Assignee: Claas OHG, Harsewinkel, Fed. Rep. of Germany

[21] Appl. No.: 152,580

[22] Filed: May 23, 1980

[30] Foreign Application Priority Data

Jun. 2, 1979 [DE] Fed. Rep. of Germany ....... 2922607

[51] Int. Cl.³ .............................................. A24C 1/08
[52] U.S. Cl. ............................ 130/272; 130/DIG. 4; 130/DIG. 5; 56/12.8; 56/16.5
[58] Field of Search ............ 130/27 Z, 27 E, DIG. 1, 130/DIG. 4, DIG. 5; 56/12.8, 13.3, 13.4, 16.5; 209/631, 639

[56] References Cited

U.S. PATENT DOCUMENTS

| 86,099 | 1/1869 | Pool | 130/27 Z |
|---|---|---|---|
| 2,670,845 | 3/1954 | Busack et al. | 130/27 Z |
| 2,732,941 | 1/1956 | Deiss | 209/261 |
| 4,194,346 | 3/1980 | Ingalls | 56/12.8 |

FOREIGN PATENT DOCUMENTS 1551745  11/1968  France ................................ 56/12.8

Primary Examiner—Robert A. Hafer
Attorney, Agent, or Firm—Michael J. Striker

[57] ABSTRACT

A radial blowing device for a harvester thresher cleaning arrangement has at least two blowers each having a double impeller with two sets of blades, two wind passages each extending from a respective one of the impellers, and two partitions each subdividing a respective one of the wind passages into two half passages, so that each of the half passages communicates with a respective one of the sets of blades of a respective one of the impellers, and each of the partitions extends up to the rotor of a respective one of the impellers.

14 Claims, 2 Drawing Figures

RADIAL BLOWING DEVICE FOR A CLEANING ARRANGEMENT OF A HARVESTER THRESHER

BACKGROUND OF THE INVENTION

The present invention relates to a radial blowing device for a harvester thresher cleaning arrangement which is composed substantially of an upper sieve, a lower sieve and a guiding bottom. More particularly, it relates to a radial blowing device which has at least two blowers with wind passages, wherein each blower has as a double impeller including two sets of blades.

Radial blowing devices for cleaning arrangements of the above mentioned general type are known in the art. The German Pat. No. 289,559 describes a blowing device for a cleaning arrangement of a thresher, wherein baffles are arranged in an outlet passage to provide for uniform distribution of the air volume over the width of the outlet passage. This distribution is attained, as a rule, by such an arrangement of baffles that they can be adjusted relative to one another. The German Pat. No. 289,559 is based on the realization of the fact that especially in wide threshers when the ventilator housing is correspondingly wide, the distribution of the air volume aspirated through the lateral openings into the outlet passage, is not uniform, the air volume considerably decreases from the lateral walls of the passage toward the central region of the same, and thereby the material traveling on the sieve surfaces is not completely cleaned by the air stream in the central region of the sieve.

When one closely examines the operation of the blowing device disclosed in this patent which intends to eliminate the above-mentioned disadvantages, he will come to the conclusion that a uniform action upon the cleaning sieve over its entire working width in the construction with the openable baffles cannot be attained, inasmuch as the known blowing device has an impeller with blades which extend over the entire width of the blower. Subdivision of the blowing device into several partial blowers is not provided, which means that the air volume and air speed decrease toward the central region of the blowing device, they reach the zero value, whereas the baffles alone cannot provide for uniform distribution of the cleaning air.

A blowing device for a grain cleaning arrangement is further known, for example from the U.S. Pat. Nos. 236,340; 2,849,118 and 2,954,123, wherein two blowers are provided which have a common wind outlet passage subdivided by a vertical wall. These blowers do not have double impellers with two inflow separated sets of blades, and no wind baffle normal to the bottom of the wind passage is provided in the latter. For these reason, the cleaning air again cannot act upon the cleaning sieve uniformly over its entire working width. Moreover, the air volume and air speed at the side of the partial blowers are considerably greater than in the central region, whereby this known blowing device has the disadvantage it that it does not provide for a complete cleaning action.

Further, a ventilating device for grain cleaning machines is disclosed in the German Pat. No. 37,594 wherein an upper suction-and-pressure blower and a lower suction blower are provided, which are subdivided into two blowers located at a distance adjacent to one another and supported by a common shaft. The upper suction-and-pressure blower aspirates from a third cleaning arrangement still existing impurities of the machine and acts by the generated pressure air upon the uncleaned grain which travels through a sieve arranged under the vibrator, onto a return bottom. The grain which is cleaned by the upper blower runs through the double suction blower arranged below, so as to be freed from lighter admixtures. This arrangement ensures that with the utilization of two ventilator-units at three locations, cleaning of the grain is attained. However, in this known construction a subdivision of the blowers located at a distance adjacent to one another is not provided and a wind baffle is not arranged. Thereby uniform distribution of the cleaning air over the entire cross section of the outlet of the blowing device is also not guaranteed.

Finally, it is known from the German Auslegeschrift No. 1,403,495 that the radial blowing device is subdivided into at least three blowers with wind passages which aspirate air at both sides, and the air travels through the wind passage via a common outlet opening. Each blower has a double impeller with two inflow separated sets of blades, wherein at least two wind baffles are arranged in the wind passage of each blower normal to the bottom. This arrangement also does not provide for uniform air distribution over the entire region of the cleaning arrangement, inasmuch as one of the wind baffles is arranged at a relatively great distance from the double impeller and thereby turbulence takes place between the double impeller and the wind baffles. On the other hand, this is because the air stream generated from the separate blowers is no longer guided after it leaves the wind passages.

SUMMARY OF THE INVENTION

Accordingly, it is an object of the present invention to provide a radial blowing device which avoids the disadvantages of the prior art.

More particularly, it is an object of the present invention to provide a radial blowing device for a harvester thresher cleaning arrangement, which provides for uniform distribution of air in the region of the entire cleaning arrangement, in satisfactory manner.

In keeping with these objects and with others which shall become apparent hereinafter, one feature of the present invention resides, briefly stated, in a radial blowing device having at least two blowers each having a double impeller with two sets of blades, and two wind passages each extending from a respective one of the double impellers, wherein means are provided for subdividing each of the wind passages into two half passages, so that each of the half passages communicates with a respective one of the sets of blades of a respective one of the impellers, and each of the subdividing means extends up to the impeller of a respective one of the blowers. The subdividing means are formed as partitions.

In accordance with another advantageous feature of the present invention, each partition partially embraces the double impeller of a respective one of the blowers.

In order to provide for better guidance of the air stream, particularly in the region of the cleaning arrangement, a further advantageous features resides in that the lateral side walls bounding each wind passage and the partitions subdividing the same into two half passages are provided with extensions which are formed as wind baffles. These wind baffles are advantageously fixedly connected with the cleaning arrangement.

In dependence upon the weather conditions and the characteristic of land, it may be required to induce a greater quantity of air onto the upper sieve than onto the lower sieve. In accordance with still a further feature of the present invention, the radial blowing device is provided with wind guiding flaps which are pivotable about mutually parallel horizontal axes and arranged in the outer region of each half passage.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
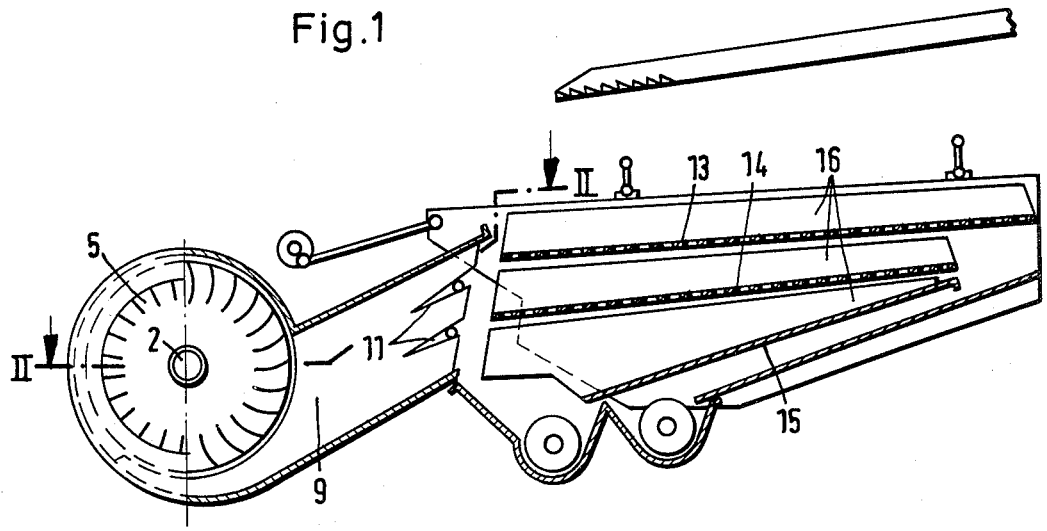
FIG. 1 is a side view of a cleaning arrangement of a harvester thresher, in accordance with the present invention.
Figure 2:
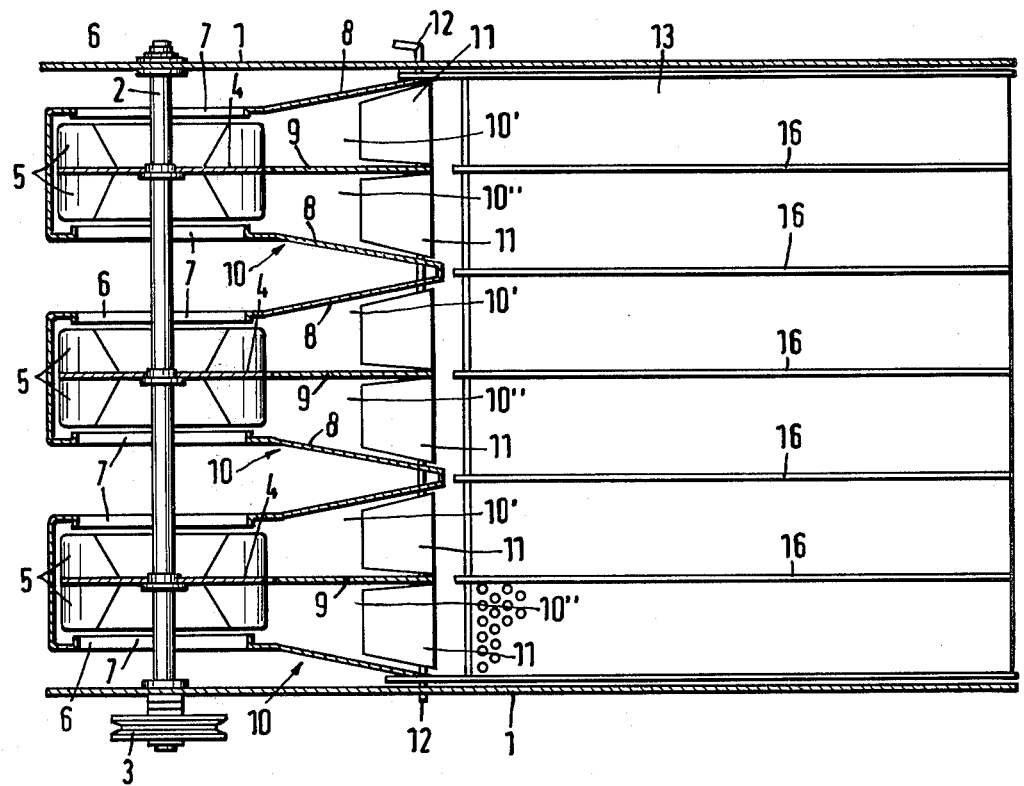
FIG. 2 is a view showing the cleaning arrangement of FIG. 1 in the section taken along the line II—II of FIG. 1.

The drawings show a cleaning arrangement for a harvester thresher which is not illustrated. Reference numerals 1 identify side walls of the not shown harvester thresher in which a shaft 2 is supported. The shaft 2 is driven in rotation by means of a V-belt pulley 3.

A plurality of blowers are mounted on the shaft 2. Each blower has a double impeller 4 with two sets of blades 5 which are inflow separated from one another. Each impeller 4 is accommodated in a housing 6 provided with two oppositely arranged suction openings 7. A wind passage 10 communicates with each of the double impellers.

Each wind passage is closed at all its sides by side walls 8. At the same time, each wind passage is subdivided by a partition 9 into two half passages 10' and 10". Each partition 9 partially embraces a respective one of the double impellers 4, so that the air which is aspirated by the blades 5 is induced into a respective one of the half passages 10' or 10".

Each of the half passages 10' or 10" of the respective wind passage 10 has an outlet end. Two air guiding flaps 11 are arranged at the outlet end of each of the half passages 10' or 10". The guiding flaps 11 are mounted pivotably about horizontal axes 12 which are parallel to one another.

In dependence upon the position of the flaps 11, the air stream exiting from the half passages 10' and 10" is induced onto an upper sieve 13 or onto the lower sieve 14, respectively, of the cleaning arrangement.

Means are provided for ensuring an exact air guidance in the region of the upper sieve 13, the lower sieve 14, and the guiding bottom 15 of the cleaning arrangement. These means are formed as air baffles 16 which form extensions of the vertically arranged side walls 8 and the partitions 9 of the wind passages.

The air baffles 16 are parallel to one another and mounted on the sieve 13, sieve 14, and guiding bottom 15. Means for mounting the baffles on the above-mentioned elements are known per se in the art, and for this reason are not shown in the drawing.

It will be understood that each of the elements described above, or two or more together, may also find a useful application in other types of constructions differing from the types described above.

While the invention has been illustrated and described as embodied in a radial blower for a cleaning arrangement of a harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A radial blowing device for a harvester thresher cleaning arrangement having an upper sieve, a lower sieve and a guiding bottom, the device comprising at least two blowers each including a double impeller with two sets of blades; at least two wind passage means each forming a wind passage which extends from each of said double impellers; and at least two subdividing means each subdividing a respective one of said wind passages into two half passages, so that each of the half passages of each of said wind passages communicates with a respective one of said sets of blades of a respective one of said double impellers, and each of said subdividing means extends up to the double impeller of a respective one of said blowers.

2. A radial blowing device as defined in claim 1, wherein said blowers are rotatable about a common axis and spaced from one another in an axial direction, said wind passages being also spaced from one another in the axial direction.

3. A radial blowing device as defined in claim 2, wherein two sets of blades of each of said double impellers are axially spaced from one another and arranged at opposite sides of the latter.

4. A radial blowing device as defined in claim 3, wherein the half passages of each of said wind passages are axially spaced from one another and located at opposite axial sides of a respective one of said subdividing means.

5. A radial blowing device as defined in claim 1, wherein each of said subdividing means is formed as a partition.

6. A radial blowing device as defined in claim 5, wherein each of said partitions partially embraces the double impeller of a respective one of said blowers.

7. A radial blowing device as defined in claim 6, wherein the double impeller of each of said blowers has a peripheral surface extending in a circumferential direction, each of said partitions embracing a portion of the peripheral surface of the respective double impeller, as considered in the circumferential direction.

8. A radial blowing device as defined in claim 1; and further comprising extension means forming an extension of each of said half passages and operative for guiding air further from the latter.

9. A radial blowing device for a harvester thresher cleaning arrangement having an upper sieve, a lower sieve and a guiding bottom, the device comprising at least two blowers each including a double impeller with two sets of blades; at least two wind passage means each forming a wind passage which extends from each of said double impellers, each of said wind passage means including two side walls laterally bounding a respective one of said passages; at least two subdividing means each subdividing a respective one of said wind passages into two half passages, so that each of the half passages of each of said wind passages communicates with a respective one of said sets of blades of a respective one of said double impellers, and each of said subdividing means extends up to the double impeller of a respective one of said blowers, each of said subdividing means including a partition located between the side walls of a respective one of said wind passage means and subdividing a respective one of said wind passages into two half passages; and extension means forming an extension of each of said half passages and operative for guiding air further from the latter, said extension means including a plurality of air guiding baffles forming extensions of said side walls and said partitions.

10. A radial blowing device as defined in claim 9, wherein said baffles are connectable with a cleaning arrangement; and further comprising means for connecting said baffles with the cleaning arrangement.

11. A radial blowing device as defined in claim 1, wherein each of said half passages has an outlet end; and further comprising means for guiding air from a respective one of said half passages selectively into the region above the upper sieve or into the region above the lower sieve, each of said air guiding means being arranged at the outlet end of a respective one of said half passages.

12. A radial blowing device for a harvester thresher cleaning arrangement having an upper sieve, a lower sieve and a guiding bottom, the device comprising at least two blowers each including a double impeller with two sets of blades; at least two wind passage means each forming a wind passage which extends from each of said double impellers; at least two subdividing means each subdividing a respective one of said wind passages into two half passages each having an outlet end, so that each of the half passages of each of said wind passages communicates with a respective one of said sets of blades of a respective one of said double impellers, and each of said subdividing means extends up to the double impeller of a respective one of said blowers; and means for guiding air from a respective one of said half passages selectively into the region above the upper sieve or into the region above the lower sieve, each of said air guiding means being arranged at the outlet end of a respective one of said half passages and includes two flaps movable between a first position in which they allow air to travel into the first-mentioned region, and a second position in which they allow air to travel into the second-mentioned region.

13. A radial blowing device as defined in claim 12, wherein said blowers have a common horizontal axis, said flaps being pivotable about two horizontal axes which are parallel to one another.

14. A radial blowing device as defined in claim 1, wherein each of said wind passages has an outlet, each of said subdividing means extending to said outlet of a respective one of said wind passages.

* * * * *